United States Patent [19]
Lichfield

[11] 3,912,292
[45] Oct. 14, 1975

[54] HORSE DRAWN VEHICLE
[76] Inventor: William H. Lichfield, P.O. Box 112, Corinne, Utah 84307
[22] Filed: Apr. 15, 1974
[21] Appl. No.: 460,944

[52] U.S. Cl. .............................. 280/63; 280/124 B
[51] Int. Cl.² .......................................... B62C 1/02
[58] Field of Search .............. 280/63, 124 B, 124 A

[56] References Cited
UNITED STATES PATENTS

| | | | |
|---|---|---|---|
| 3,054,625 | 9/1962 | Haley | 280/124 B |
| 3,388,921 | 6/1968 | Pickard | 280/63 |
| 3,473,821 | 10/1969 | Barenyl et al. | 280/124 B |
| 3,589,700 | 6/1971 | Ruet et al. | 280/124 B |

Primary Examiner—David Schonberg
Assistant Examiner—Michael J. Forman
Attorney, Agent, or Firm—Criddle & Thorpe

[57] ABSTRACT

A horse drawn vehicle with replaceable body units to convert the unit to different uses and a suspended chassis to accommodate the body units. The chassis includes a central tongue, with a shock absorbing, torsion bar wheel mounting at one end of the tongue and a dual safety neck yoke at the other end.

9 Claims, 6 Drawing Figures

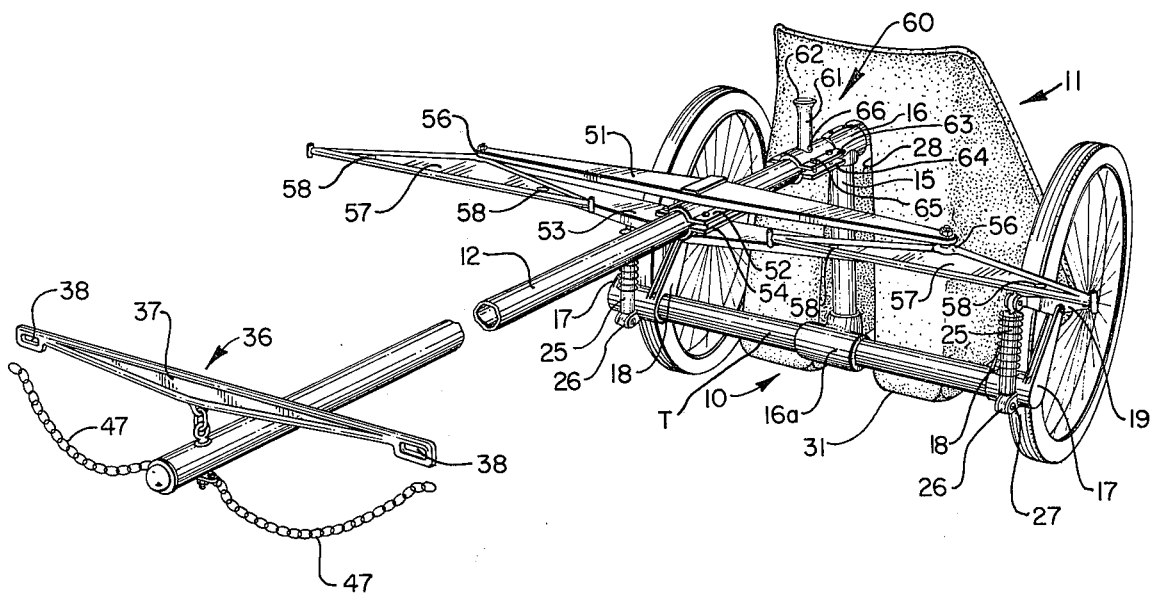
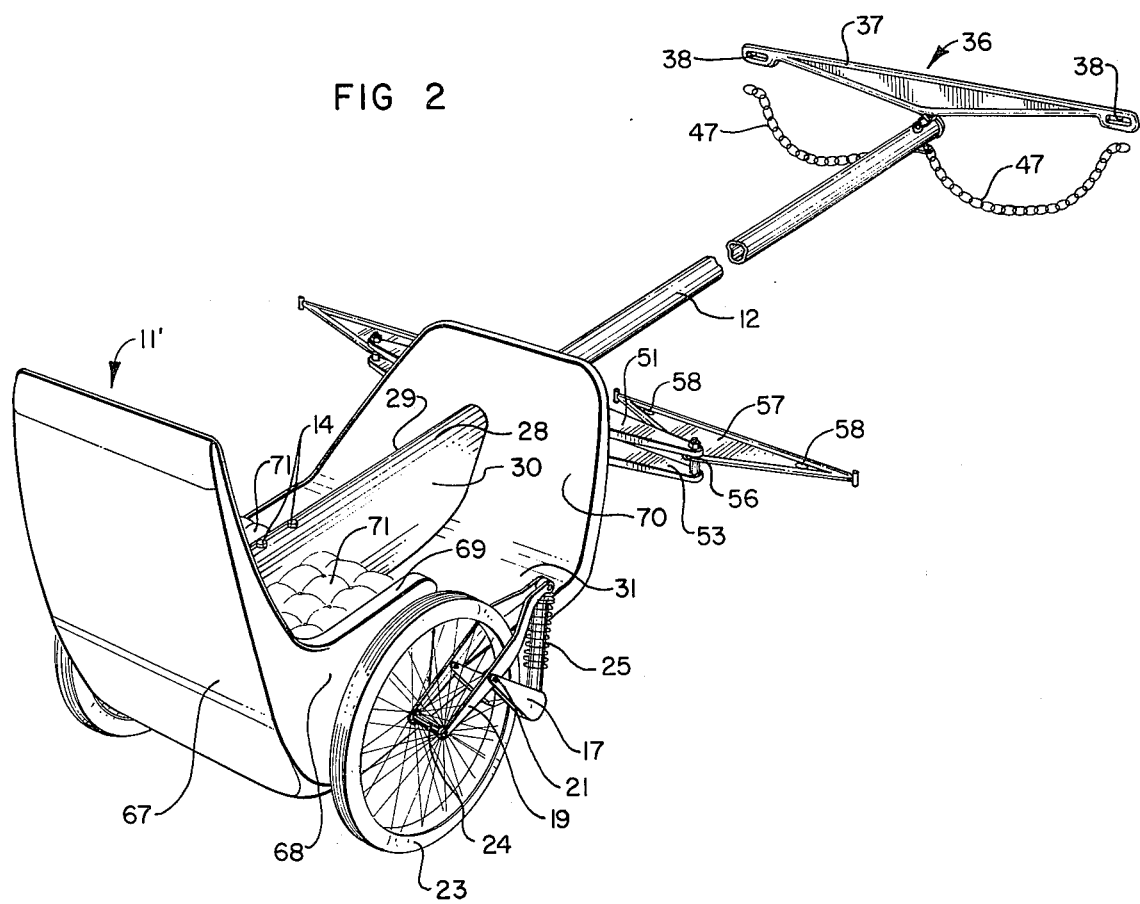

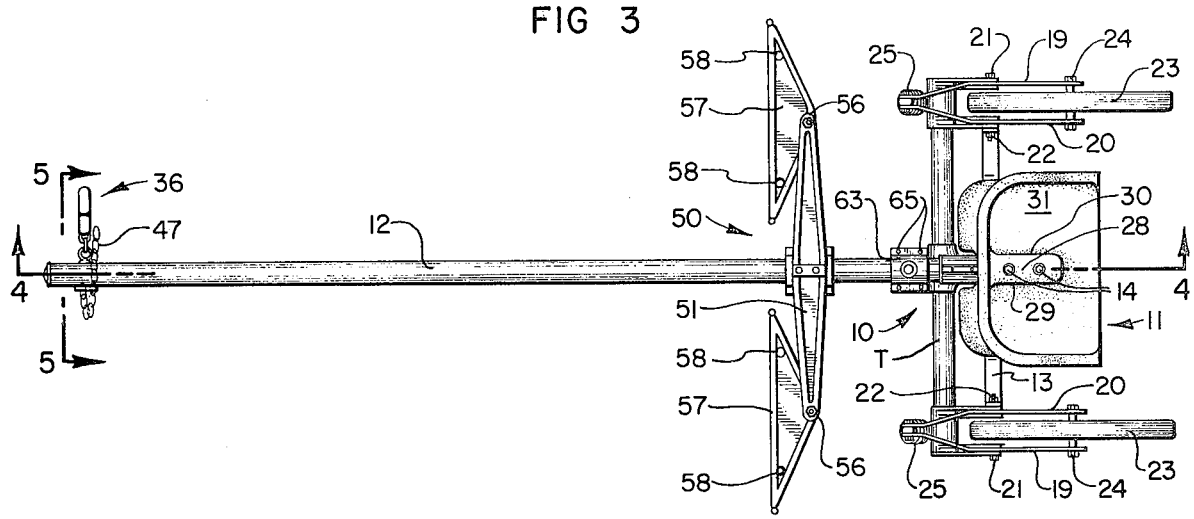
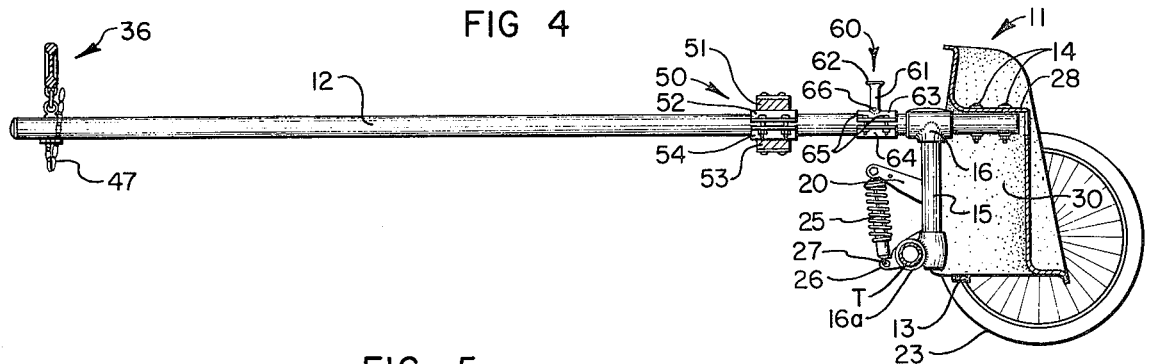
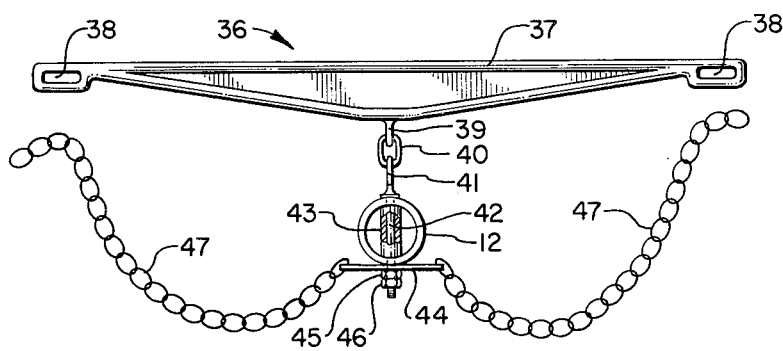
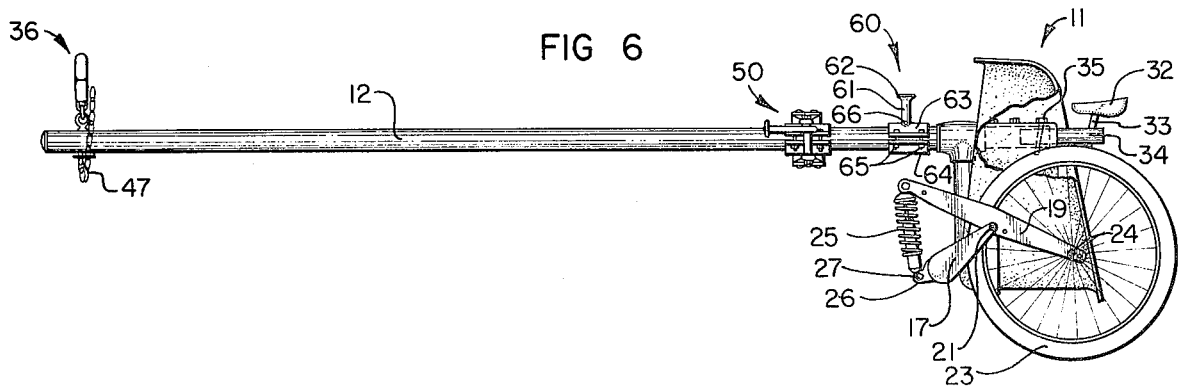

HORSE DRAWN VEHICLE

BRIEF DESCRIPTION OF THE INVENTION

1. Field of the Invention

This invention relates to horse drawn vehicles and particularly to two-wheeled vehicles such as chariots and surreys.

2. Prior Art

Chariots, surreys and other horse-drawn vehicles have long been known. For the most part these have been poorly sprung or have had no spring suspension. The ride obtained has, as a result, oftentimes been very uncomfortable, and particularly in the case of chariots used for racing, the ride can be very dangerous. Even when some form of spring suspension has been used, it has generally been of a conventional, cumbersome, heavy leaf or coil spring type that adds unnecessary and undesirable weight to the vehicle and that limits the body used with the vehicle chassis to a particular type that may not be usable for all particular needs.

SUMMARY OF THE INVENTION

Principal objects of the present invention are to provide a spring chassis that is lightweight, durable, and adaptable to receive different types of bodies as the unit is converted from one use to another.

Still other objects are to provide such a chassis that has a safety suspension assembly that does not add a significant amount of weight to the chassis, but that will maintain support of the chassis by a horse, even if the principal connecting means between the horse and the chassis should fail.

Principal features of the invention include an elongate tongue having a transverse torsion bar suspended beneath one end thereof; cantilevered arms extending from opposite ends of the torsion bar; pivot connections on the ends of the cantilevered arms remote from the torsion bar; and lightweight wheels journaled for rotation on hubs at one of the ends of wheel support arms that are pivotally mounted, intermediate their lengths at the pivot connections of the cantilevered arms. Conventional spring assisted shock absorbers interconnect the other ends of the wheel support arms and short lugs fixed to and projecting from the torsion bar.

The other end of the tongue has the usual yoke thereon and, in addition, has safety chains connected to the tongue through the yoke attachment structure.

The tongue of a tubular construction and a lightweight double tree assembly and a whip holder are adjustably clamped to the tongue.

Additional objects and features of the invention will become apparent to those skilled in the art from the following detailed description and claims, taken with the accompanying drawings.

THE DRAWINGS

In the drawings:

FIG. 1 is a perspective view taken from above and at the front of a vehicle of the invention, including a chariot body;

FIG. 2, a perspective view taken from above and at the rear of a vehicle of the invention with a surrey body;

FIG. 3, a top plan view of the vehicle as shown in FIG. 1;

FIG. 4, a vertical section view of the vehicle taken on the line 4—4 of FIG. 3;

FIG. 5, an enlarged transverse section through the tongue, taken on the line 5—5 of FIG. 4, and showing the neck yoke and safety chain assembly; and FIG. 6, a side elevation view of the vehicle as in FIG. 1, but showing a seat attached thereto for the operator, and with the chariot body partially cut away for clarity.

DETAILED DESCRIPTION

Referring now to the drawings:

In the illustrated preferred embodiment, the invention includes a chassis, shown generally at 10 (FIG. 3) and a body which may be of several different configurations, such as, for example, the chariot shown at 11 in FIGS. 1 and 6 or the surrey as shown at 11' in FIG. 2. The bodies, such as 11 or 11' are preferably made of a durable, lightweight material such as a suitable molded plastic or fiberglass. Whatever the body configuration, it is made to straddle the tubular tongue 12 and to be supported from beneath by a hanger bar 13. Bolts 14, inserted through holes provided therefore in the portion of the body straddling the tongue and threaded into the tongue, may be used to fix the body position relative to the tongue.

A support post 15 depends from a clamp 16 that is adjustably fixed along the tongue 12, and a clamp 16a at the lower end of the support post is fixed to the center of a transversely extending torsion bar T (which preferably is of the same tubular material as the tongue 12 and support post 15).

A pair of spaced apart, parallel torsion arms 17 and 18 project upwardly and rearwardly at opposite ends of the torsion bar and are fixed to the torsion bar, as by welding or the like.

Wheel support arms 19 and 20 are each respectively pivotally connected intermediate their lengths at 21 and 22 to the bifurcated ends of torsion arms 17 and 18. A wheel 23 is journaled on an axle shaft 24 that extends between the rearmost ends of the wheel support arms, and the other ends of the wheel support arms are pivotally connected to one end of a conventional, spring-assist, shock absorber 25. The other end of each shock absorber 25 is then pivotally connected at 26 to a short lug 27, welded or otherwise affixed to the torsion bar.

It will be apparent that as a wheel 23 moves up or down with respect to the tongue 12 and support post 15 it will pivot its support arms 19 and 20 around their pivots 21 and 22. Such pivoting action will be caused by the spring of the shock absorber or will be dampened by the piston of the shock absorber 25. At the same time, because the pivot connections 21 and 22 are cantilevered with respect to the torsion bar T, the movement of the wheel will tend to move the pivot connections 21 and 22 about the connection of the torsion arms 17 and 18 to the torsion bar, thereby applying a torque force through the torsion arms to the torsion bar.

As previously noted, the body of the vehicle is made to straddle the tongue 12 and for this reason, each body used, has a tunnel 28 formed therein. The walls 29 and 30 of the tunnel extend downwardly on opposite sides of the tongue to a base 31 of the body, and the base 31 rests on the hanger bar 13 (FIG. 3). The ends of hanger bar 13 are angled upwardly and are pivotally connected to the wheel support arms 19 at the pivot connections of the wheel support arms and the torsion arms 17. The body may merely rest on and be supported by the hanger bar 13 or it can be bolted, bonded, or otherwise affixed thereto.

The tunnel 28 of body 11 projects into the space formed by a semi-encircling wall 31 and is straddled by an operator standing in the chariot body to operate the vehicle. The operator's knees can grip the tunnel to give him added stability. If desired, a bicycle-type saddle seat 32 (FIG. 6) can be attached to allow the operator to selectively stand, while straddling the tunnel, or to sit on the seat. Seat 32 has the usual post 33 projecting downwardly therefrom and transversely through a sleeve member 34. The sleeve member 34 is telescoped into the end of tongue 12 (through a hole provided therefor in the wall of tunnel 28) and is locked in place by a bolt 35 inserted through matching holes in the tongue 12 and sleeve member. So mounted, the seat is held against withdrawal from the tongue and against rotation with respect to the tongue.

A yoke 36, which preferably is made in a single piece from a lightweight material, such as aluminum, has a ribbed crosspiece 37 with holes 38 at opposite ends thereof by which the ends of the yolk are attached to the neck collars (not shown) of the horses used to pull the vehicle. An eyelet 39 is formed at the middle of the crosspiece and hangs downwardly therefrom to be connected by a locking ring 40 to an eye 41 of an eye-bolt 42. The eye-bolt 42 extends loosely from eye 41, downwardly through a sleeve 43 that is inserted through tongue 12 at the end thereof remote from the body 11. A plate 44 is mounted on the bolt 42, beneath the tongue and a pair of lock nuts 45 and 46 are threaded onto the bolt to securely hold it in the sleeve 43. A pair of safety chains 47 are connected to the plate 44 and are each adapted to be connected to a horse collar (now shown) so that if the crosspiece 37 should fail, the tongue would only drop slightly before being supported by the safety chains, thereby allowing an operator to continue control of the horses and to safely stop the vehicles.

A double-tree assembly 50 is adapted to be adjustably mounted on the tongue 12 at some point just forward of the body used. The double tree assembly 50 includes an upper crossbar 51 having a centrally mounted clamp member 52 and a lower crossbar 53 having a centrally mounted clamp member 54. The clamp members 52 and 54 are adapted to fit against opposite sides of tongue 12 and to be bolted together as clamps on the tongue at any desired location therealong. The crossbars 51 and 53 are also each preferably constructed of a lightweight material such as aluminum and they are connected at their ends by spacer pins 56. The apexes of triangular shaped, whiffletrees 57 are pivotally mounted on the spacer pins. The whiffletrees are preferably made of a lightweight material such as aluminum and are ribbed for strength. Holes 58 are provided in each of the corners other than the apex to allow a harness (not (shown) to be connected thereto.

A whip holder 60, comprising an upstanding tube 61, having an outwardly flared top edge 62 projecting from a top clamp member 63 and a lower clamp member 64 is also adjustably mounted to the tongue 12. Bolts 65 secure the clamp members 63 and 64 together at any desired position on the tongue. A small hole 66 is provided through the tube 61 at its junction with the top clamp member 63 so that water that would otherwise collect in the tube can be drained.

The butt end of a whip is inserted into the tube 61 and projects upwardly therefrom to serve as a handle for the operator to grasp during movement of the vehicle. This is particularly important during fast starts such as are frequent during chariot races. The flared lip insures easy positioning of the whip even during travel and it will be apparent that the whip can be easily withdrawn.

The body 11' is very similar to the body 11, except that a wall 67 curves from the rear of the tunnel 28 to form side walls 68 and arm rests 69 at opposite sides of the body. In addition, the base 31 of the body extends forwardly and curves upwardly to form a foot rest and mud guard 70. The tongue 12 extends through a tunnel 28 extending rearwardly of the foot rest and mud guard to provide further support for the body on the chassis. As with the body 11, the body 11' can be merely rested on hanger bar 13 or it can be bolted, bonded or otherwise affixed thereto. Seats 71 are provided between the arm rests 69, the tunnel 28 and wall 67 which is also extended upwardly to form seat backs of a surrey.

The vehicle of the present invention is lightweight, comfortable to ride in, sturdy and relatively low cost to construct. It is easily converted to different configurations for different purposes.

Although a preferred form of my invention has been herein disclosed, it is to be understood that the present disclosure is by way of example, and that variations are possible without departing from the subject matter coming within the scope of the following claims, which subject matter I regard as my invention.

I claim:

1. A horse drawn vehicle comprising
    a chassis having
        an elongate tubular tongue,
        a hanger bar depending from the tubular tongue intermediate its length,
        a torsion bar extending transversely to said tongue and said hanger bar, fixed to said hanger bar intermediate its length,
        a pair of spaced apart torsion arms adjacent each end of the torsion bar said torsion arms being fixed to and cantilevered from said torsion bar,
        a wheel support arm pivotally connected, intermediate its length, to the end of each of the torsion arms,
        a wheel for each pair of wheel support arms, means journaling each said wheel at ends of the pair of wheel support arms connected to each pair of torsion arms, and
        a spring assist shock absorber pivotally connected at one end to the other ends of each pair of wheel support arms and having the other end fixed to the torsion bar.

2. A vehicle as in claim 1, further comprising
    a body straddling the tongue at one end thereof; and
    a support hanger extending beneath the body and between adjacent central wheel support arms.

3. A vehicle as in claim 2, wherein the body is shaped as a chariot and a saddle seat is telescoped into the tongue to project rearwardly from the portion of the body straddling the tongue.

4. A vehicle as in claim 2, further including a whip holder adjustably positioned on the tongue, and forwardly on the tongue with respect to at least a portion of the body.

5. A vehicle as in claim 4, wherein the whip holder comprises upper and lower clamp members adapted to encircle the tongue;

means for securing said clamp members together, tightly around the tongue; and an upright tubular member projecting from said upper clamp member.

6. A vehicle as in claim 5, wherein the upright tubular member has a flared upper end and a hole therethrough adjacent to the other end, which other end is fixed to the said upper clamp member.

7. A vehicle as in claim 1, further including a safety suspension assembly comprising an eye bolt inserted downwardly through the tongue at the end thereof remote from the chassis, a neck yoke extending transversely with respect to the yoke and loosely linked to the eye of the eye bolt, a plate extending transversely to the tongue and mounted on the eye bolt, and a pair of chains fixed to and extending from the plate.

8. A vehicle as in claim 7, wherein the neck yoke is made of one piece, cast aluminum material.

9. A vehicle as in claim 6, further including a double tree having upper and lower arms and a central clamping member releasably clamped to the tongue between the chassis and the neck yoke, and a whiffletree, pivotally connected at each end of the double tree, said double tree arms and said whiffletrees, being of cast aluminum material.

* * * * *